April 2, 1935.  F. C. FROLANDER  1,996,469
RENEWABLE FILTER
Filed Feb. 24, 1932  3 Sheets-Sheet 1
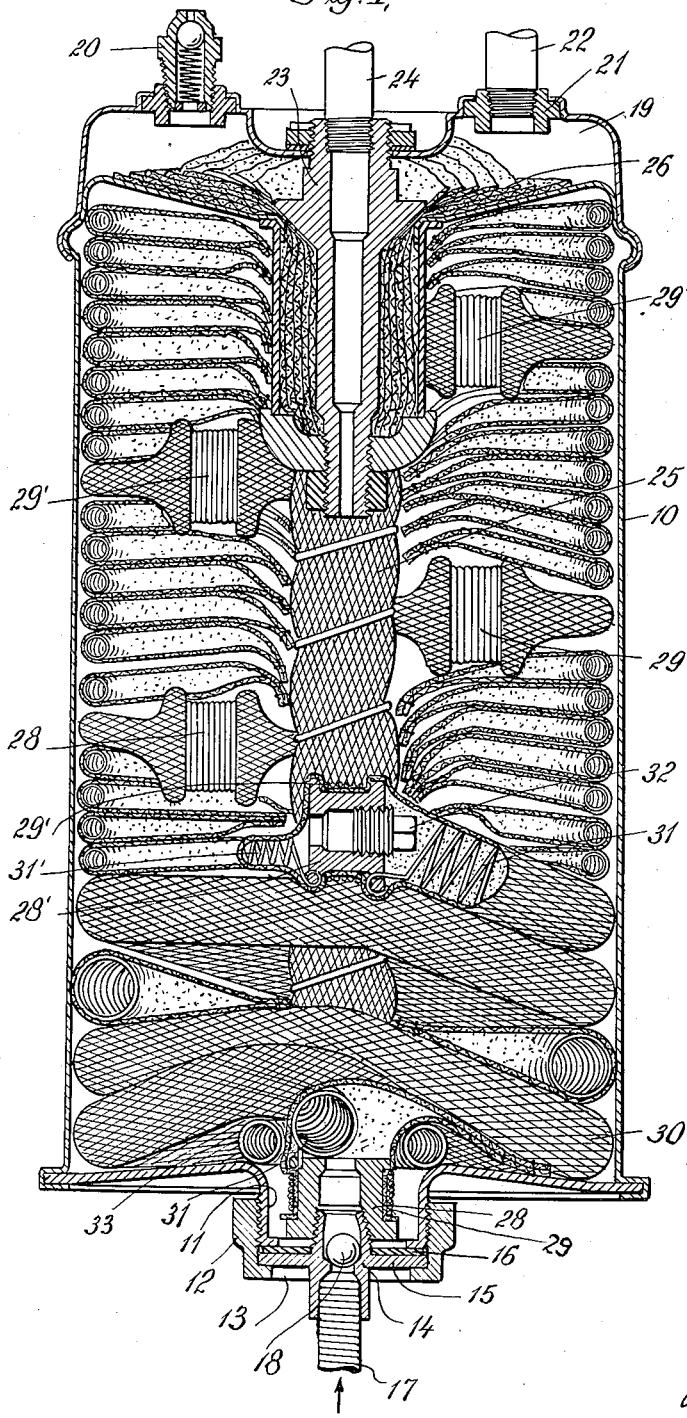
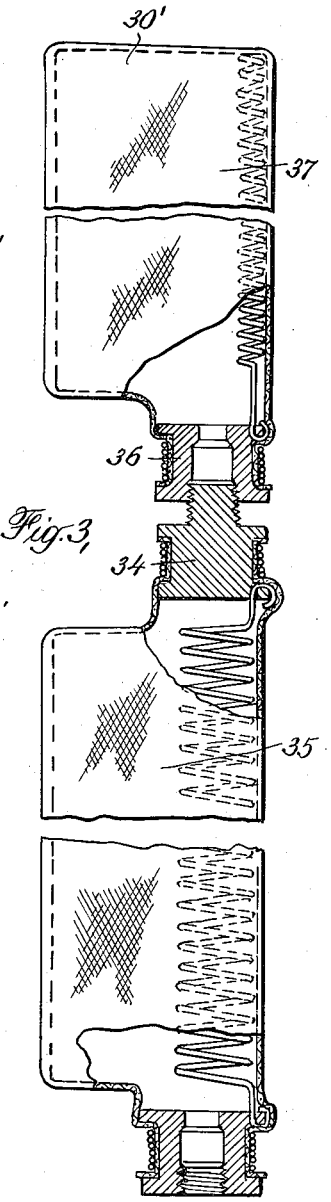
INVENTOR
Frank C. Frolander
BY
ATTORNEYS

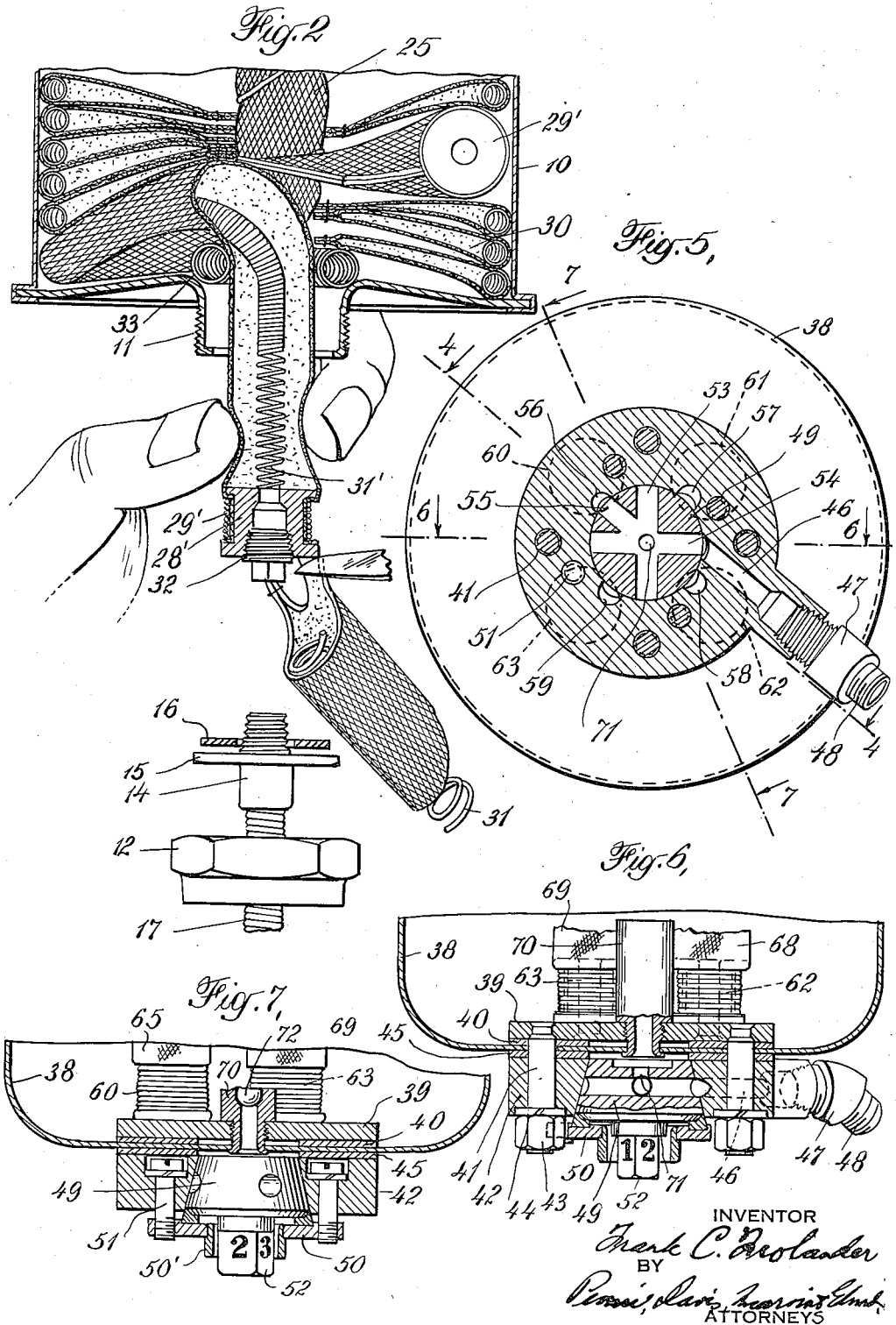

April 2, 1935.  F. C. FROLANDER  1,996,469
RENEWABLE FILTER
Filed Feb. 24, 1932   3 Sheets-Sheet 3
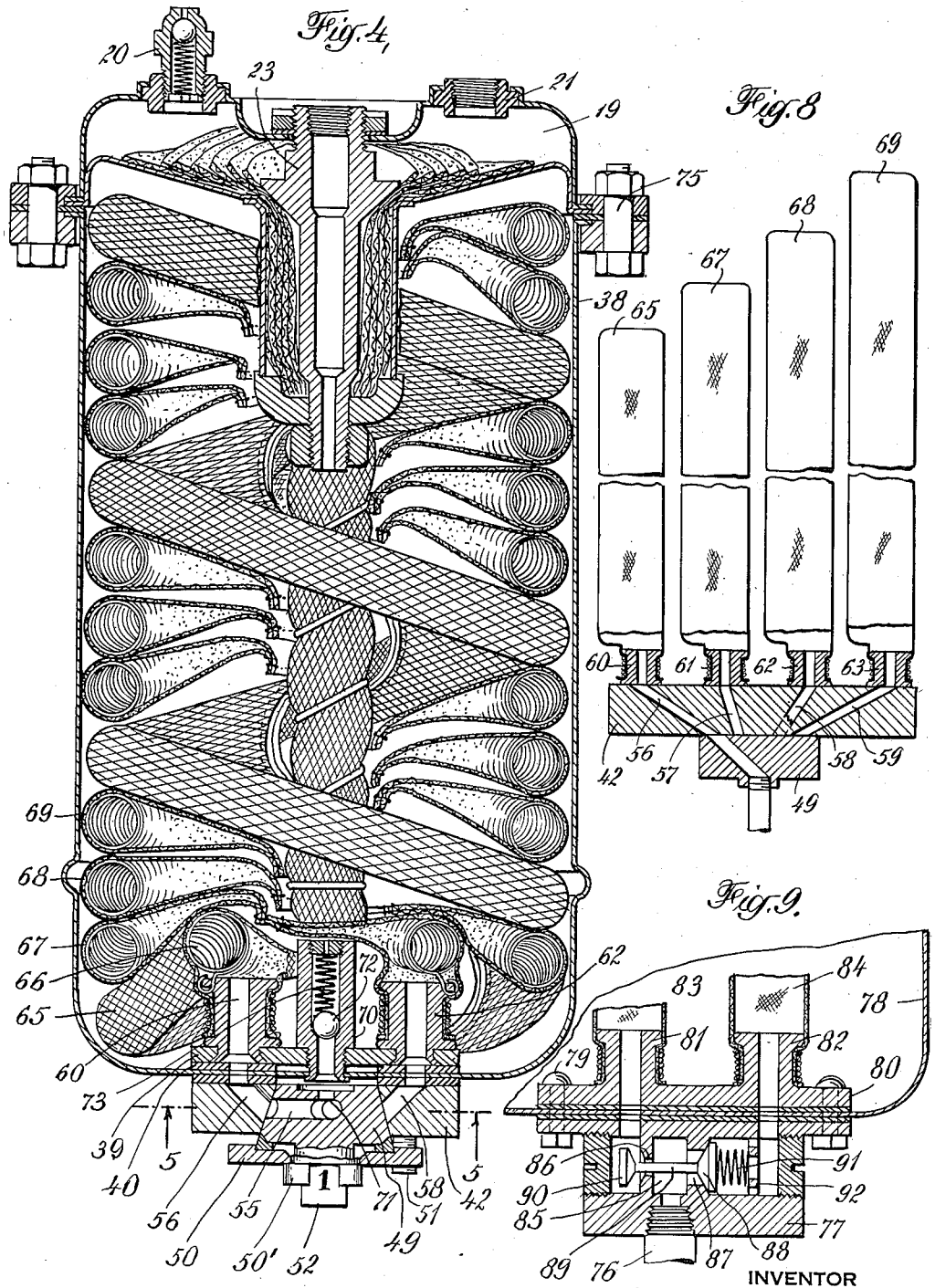

Patented Apr. 2, 1935

1,996,469

UNITED STATES PATENT OFFICE 1,996,469

RENEWABLE FILTER

Frank C. Frolander, Elizabeth, N. J.

Application February 24, 1932, Serial No. 594,806

10 Claims. (Cl. 210—164)

This invention relates to filters and has particular reference to a filter for removing the solid materials deposited in the lubricating oil of an internal combustion engine during its operation.

It is well known that hard and soft carbon flakes resulting from the combustion in the cylinders of internal combustion engines, metal particles from the bearings of the machinery, and grit and dirt entering the engine are deposited in the lubricating oil in the crank case of the engine and are harmful to the bearings and other moving parts of the mechanism to which the oil is subsequently fed by the oil circulating pump.

It is common practice to employ filters for removing this solid material from the lubricating oil and these filters are located either in the oil line leading from the oil pump to the bearings or in the by-pass leading from the oil pump back to the crank case. These filters are usually provided in two principal forms, one having a large filtering surface and said to be useful for a long period of time because of its large filtering capacity, and the other being arranged for the removal and replacement of the filter bag or filter unit.

The first or large area type of filter remains effective for several thousand miles but thereafter the thick filtrate sludge which accumulates on the surfaces of the filter renders the filter progressively less effective as time goes on because of the resistance by the thick sludge bed to the passage of oil therethrough. Consequently, after a few thousand miles of use the effectiveness of the filter decreases rapidly and although the filter is ordinarily not replaced with a new one until after the car has been operated for eight or ten thousand miles, it should be replaced much earlier in order to obtain really effective oil filtration.

In the replaceable type of filter the periodic removal and replacement of the filter unit is a considerable nuisance and the user frequently neglects to do so and the relatively small filter becomes so clogged that it is no longer effective to filter the oil properly.

In the filter of the present invention, the filter may be renewed from time to time as the filter surfaces become clogged with the filtrate sludge and this renewal may be performed quickly and conveniently and without entirely removing the old filter unit and substituting a new filter unit therefor. In the present invention the filter unit comprises a plurality of separate sections which are used successively as the preceding sections become clogged, all of these sections being mounted in the same container and being placed into action at the proper time by the operator of the vehicle or automatically. The invention also takes into consideration the fact that the quantity of solid deposits in the oil increase with the use of the car so that an increasingly larger filtering area per unit of time becomes necessary as the car grows older.

More particularly, the invention comprises a container adapted to be mounted under the hood of an automobile engine and connected in the oil supply line leading from the oil circulating pump. The container contains a plurality of separate filter sections, only one of which is used at a time. In one form of this invention each filter section is removed entirely as it becomes filled or clogged with the filtrate sludge, and in another form of the invention the oil supply is simply switched selectively manually or automatically from one filter section to the other as the first filter unit becomes clogged with the filtrate sludge.

Of the several filter sections contained in this single container, the first section has less filtering surface than the next succeeding section, etc., so that the last section has considerable filtering surface. This arrangement conforms to filtering requirements, for, when an automobile is new, the quantity of solid material deposited in the oil is relatively small during the first two to three thousand miles, whereas a greater filtering surface is necessary during the second two or three thousand miles, because of the greater quantity of solid material deposited in the oil, etc., until after the automobile has been driven more than eight or ten thousand miles a considerable filter surface is necessary to remove all of the solid material. Accordingly, the capacity of the filter conforms proportionally to the supply of solid material, and at the end of every definite period of use of the automobile such as after every two or three thousand miles, the oil supply is switched to a new filter section while the old filter unit is either removed or becomes inactive.

The new filter may be provided in all sizes and has various lengths of life depending upon the nature of the engine upon which it is used and the number of filter sections which are placed in the container, this last requirement largely depending upon the allowable space permitted for a container of requisite capacity to hold the filter sections. Although the invention has been described in connection with use on an automobile, it may be used with equal facility on a marine or aeroplane engine or with any other oiling system or where it is desired to remove solid material from oil or other liquids.

For a more complete understanding of the invention reference may be had to the accompanying drawings, in which Figure 1 is an axial section through one form of the new selectively renewable filter of this invention;

Fig. 2 illustrates the manner in which the filter may be renewed;

Fig. 3 is a partial view of a modified form of the connection between the several filter sections or units;

Fig. 4 is an axial section through a modified form of the selectively renewable filter of this invention as seen along the line 4—4 of Fig. 5;

Fig. 5 is a bottom view and partial section thereof as seen along the line 5—5 of Fig. 4;

Fig. 6 is an axial section through the lower end thereof as seen along the line 6—6 of Fig. 5;

Fig. 7 is a similar section as seen along the line 7—7 of Fig. 5;

Fig. 8 is a diagrammatic view of the sectional arrangement of the filter illustrated in Fig. 4, and Fig. 9 is an axial section through the lower end of another modified form in which the transfer of the oil supply from a used filter section to an unused filter section is accomplished automatically.

Referring to Fig. 1 of the drawings, numeral 10 designates a sheet metal container which may be mounted under the hood of an automobile engine or on or adjacent to a marine or aeroplane engine, or the like. The bottom of the container 10 is provided with a central opening having a threaded rim 11 upon which is removably screwed the cap 12 having the central opening 13. Seated within the cap 12 is a nipple 14 having the peripheral flange 15 which urges the gasket 16 against the edge of the rim 11 when the cap 12 is screwed home so that the nipple 14 is liquid-tight in the bottom of the container 10.

Secured to the outer end of the nipple 14 is an oil intake tube 17, which may be flexible spiral tubing, as shown, seamless metal tubing, or the like. This tube 17 is connected to the oil circulating pump of the engine in the usual way and supplies oil to the container through the nipple 14. The nipple 14 preferably contains the gravity ball valve 18 which prevents return flow of the oil from the container 10 when the oil pump is shut off.

The upper end of the container 10 is provided with a separate chamber 19 having the air inlet valve 20 and the outlet 21, which is connected by pipe 22 to the intake manifold of the engine. Suitably secured in the upper wall of the chamber 19 is a hollow sleeve 23, which extends downwardly into the container 10 and communicates therewith at one end and is connected at its other end to pipe 24 leading back to the crank-case of the engine, or to the bearings, or the like for supplying oil thereto. The sleeve 23 carries a wick 25, whose spread-out upper end 26 lies in the chamber 19 and serves as an evaporator. This wick abstracts from the oil in the container 10 the liquid diluents, such as gasoline and water, and conducts them to the evaporator 26, from which the gasoline and water are evaporated by the small amount of air drawn into the chamber 19 through the air valve 20 by the suction induced through the pipe 22 by the intake of the engine. The chamber 19, the air valve 20, the suction pipe 22 and the wick 25 form no portion of the present invention, being illustrated and described in greater detail in an application, Serial No. 319,129, filed November 13, 1928 by the present applicant and Martin Czarny. These details are illustrated herein merely to show the adaptability of the new filter to an oil rectifier in which the liquid impurities are also removed, but it is to be understood that for ordinary filtering purposes the wick 25 and its appurtenant parts will not be necessary, it being only necessary to provide a clean oil outlet similar to pipe 24.

Removably screwed on the threaded inner end of the inlet nipple 14 is a spool-shaped ferrule 28, within the outside groove of which is secured, by means of a wire 29, or the like, an elongated filter unit comprising a long narrow bag 30 of cotton fabric or the like preferably sewn into shape with the nap on the inside. A wire coil 31 inserted in the filter bag 30 holds it in partially distended condition and one end of this wire coil 31 is secured to the ferrule 28 in the manner illustrated in Figs. 1 and 3. A wire coil ring 33 encircles the bag 30 adjacent the lower opening of the container and serves to aid in the proper withdrawal of the bag without bunching, as will be described later.

The filter bag 30 is coiled helically within the container 10 in the manner illustrated, and is divided into separate lengths or sections by similar spools 28' secured to the bag 30 by wire 29'. The spools 28' are identical to spool 28 and may be used in any number depending either upon the number of sections desired, or upon the size of the containers, or upon the desired length of the filter bag sections which are separated by the ferrules 28'. The extreme end 30' of the filter bag 30 is sewn shut as indicated in Fig. 3, and does not contain one of the ferrules 28'. Each ferrule 28' is normally closed by the pipe plug 32.

The next ferrule 28' following ferrule 28 carries the opposite end of the wire coil 31 which has been described as employed to distend the filter bag 30. Similar wire coils 31' are inserted within the corresponding bag sections and are connected at their ends and extend between the successive ferrules 28', but these coils are of smaller diameter than the coil 31 so as to take up less space in the container 10. Coil 31 is made of relatively large diameter for the reason that the filter bag 30 is originally packed tightly in the container 10 and the first section thereof must be distended to considerable extent to admit the oil, while it is not necessary to distend the remaining filter sections to such an extent, because at least the first filter section has been removed from the container 10 before the successive sections come into action, so that there is sufficient space in the container to permit distension of the bag sections 30 by the oil pressure therein.

In operating the new filter, that section of the filter bag extending between ferrule 28 and the first ferrule 28' is the only one of the filter sections which is in use initially, because the other sections are disconnected therefrom by the pipe plug 32 in the first of the ferrules 28'. Accordingly, the oil supplied to the container by the supply tube 17 passes through nipple 14 into the first section of the filter bag 30 and is forced through the walls thereof, the solid matter contained in the oil being deposited on the inner surface of the filter cloth. Although the other sections of the filter are immersed in the clean oil in the container 10, they perform no portion of the filtering action described, but remain inactive.

This first section of the filter 30 is arranged to effectively remove solid material from the oil for a predetermined period before it becomes clogged with the filtrate sludge and ceases to function properly. This period of effectiveness depends upon the amount of solid materials in the oil and upon the extent of use to which the automobile is put. For ordinary purposes, however, the capacity of the first section of the filter unit is made sufficient to last between two and three thousand miles of operation of the automobile, for example, before it becomes clogged with the filtrate sludge and loses its effectiveness. At this time the user of the car or other person unscrews cap 12 from the extension 11 at the bottom of the container 10, and withdraws the ferrule 28 and the first section of the filter 30, that is, the used portion thereof, from the container 10. The wire coil ring 33 feeds this section evenly without bunching and squeezes back most of the oil therein. Withdrawal of the first section of the filter 30 brings with it the second section from which the first section is removed in the manner illustrated in Fig. 2, i. e., by cutting it off with a knife or other instrument. The first section is then discarded and the pipe plug 32 is removed from the second ferrule 28'. Then the nipple 14 is screwed into the threaded opening of the second ferrule 28' and is secured in place in the bottom opening of the container 10 by screwing the cap 12 in place in the manner described.

The filter is then renewed and ready for a second continuous operation of between two to three thousand miles, for example. This process may be repeated until all of the sections of the filter have been used, whereupon the entire container 10 may be removed and replaced with a new cartridge of unused filter sections or, if the container 10 is openable, a new series or group of filter sections may be inserted therein in a manner readily understood.

Because more and more carbon flakes and particles are deposited in the lubricating oil of an engine as the engine grows older, it is preferable that the sizes of the filter sections be graduated to compensate for this increase in pollution of the oil. For example, when a car is new, the amount of carbon deposited in the oil is relatively small, so that the first section of the filter can be short or is otherwise of relatively small area and still be effective for a period up to three thousand miles, for example. During the second two or three thousand miles of use of the car an increased amount of solid particles is deposited in the oil, so that the second section of the filtering unit is preferably longer or of increased area, etc., until the last section of the unit has considerable area to be effective for removing the heavier deposits from the oil when the car is being operated after from eight to twelve thousand miles, for example.

Various other ways of maintaining the several sections of the filtering unit separate may be employed. For example, as illustrated in Fig. 3, instead of making it necessary to sever the filter cloth at each ferrule as the preceding portions of the filter bag are used or become clogged, the filter bag may be made up of individual sections. For example, a plug 34 may be employed to close the rear end of the first filter section 35 and serve as a stopper for the ferrule 36 of the second filter section 37, so that as the first filter bag becomes clogged it may be withdrawn from the container 10 in the manner described and simply removed from the second filter section 37 by unscrewing the plug 32 therefrom. This is a more convenient and cleaner method of renewing the filter since all of the sludge is contained within the first filter section 30 and cannot spill out as is liable to be the case when it is severed by means of a knife or the like.

In a modified form of the invention it is not necessary to remove any of the filtering units or otherwise open the container to renew the filter, but the oil supply is merely switched from one section to an unused section of the filter. Such an arrangement is shown in Fig. 4 and comprises a container 38 which is similar to that shown in Fig. 1 except that it is openable by releasing bolts 75. A plate 39 lies on the bottom of container 38 and is secured thereto over gasket 40 by studs 41 passing through the gasket 40, the bottom of the container 38, gasket 45 and block 42 and secured in position by nuts 43 over lock washers 44.

Communicating with a horizontal passage 46 through the block 42 is an elbow 47 to which the oil supply pipe 48 from the oil pump is connected. Journalled in the block 42 is a four-way conical valve 49 which is held in place in the block by a ring 50 secured to the block by the tap screws 51 and notched for the reception of nuts 43 which hold the ring against rotation. The stem 52 of the valve 49 extends through the washer 50 and bears index numbers, running preferably from one to four and visible through an opening in a screen 50' on ring 50.

The valve 49 has two diametral passages 53 and 54 and one radial passage 55. Adapted to communicate in various ways in the passage 46, are four diagonal passages 56, 57, 58 and 59 which communicate through the bottom of the container 38 and the gaskets 40 and 45 with four ferrules 60, 61, 62 and 63, respectively, secured to the inside plate 39.

As shown in Fig. 5, the inlet passage 46 is connected through passages 54, 55 and 56 with the ferrule 60 while the other ferrules are disconnected from the intake passage 46. However, it will be seen that when the valve 49 is rotated so that the index number "2" on its stem 52 is visible, passage 56 will be disconnected and passage 57 will be connected through passages 53, 55 and 57, with ferrule 61. In a similar way ferrules 62 and 63 may be connected to the intake.

Connected to ferrule 60 by wire 64 wound around the outer surface thereof, is a filter bag or section 65 which is coiled helically within the container 58 and is sewn closed at its free end in the manner explained in connection with Fig. 3. Within this filter section 65 so as to keep it distended is a coil of wire 66, which is secured at one end to the ferrule 60 and extends lengthwise through the filter section 65. Similar filter sections 67, 68 and 69 are connected in the same way to the remaining three ferrules 61, 62 and 63 respectively, and are coiled in successive layers within the container 38 in the manner illustrated in Fig. 4 each containing a wire coil to keep it distended.

As illustrated diagrammatically in Fig. 8 the first filter section 65 is shorter and therefore has less filtering area than second filter section 67 which in turn has less area than third filter section 68 while filter section 69 is of relatively large area. As explained in connection with the arrangement illustrated in Fig. 1 the first filter section 65 is adapted to be used when the oil is relatively clean and fresh and when the engine is new and little carbon is deposited in the oil. As the car begins the next few thousand miles, filter section 67 is in use and this section, because of its large area is capable of removing the increased quantity of solids deposited in the oil, etc.

A by-pass 70 communicates directly with the intake 46 through a vertical passage 71 connected to the junction of passages 53, 54 and 55 in the valve 49 and with the interior of the container 38. This by-pass 70 is normally closed by a ball valve 72 held in its seat by a relatively strong spring 73, so that the by-pass passage 71 is normally closed.

In operation, the modified form of the renewable filter of this invention as illustrated in Figs. 5 to 8, inclusive, functions on only one of the filter sections 66, 67, 68 or 69 at a time. Assuming that the filter is mounted on an automobile, the oil is supplied through pipe 48, elbow 47, passage 46, passage 54, passage 55, passage 56, ferrule 60 into the filter section 65 where the solid impurities therein are filtered out and the clean oil flows from the container in the manner readily understood.

After the first few thousand miles, say between two and three thousand miles, the filter should be renewed because the first filter section 65 is clogged with filtrate sludge and is no longer efficient. The operator then rotates valve 49 a quarter turn so that index numeral 2 is visible, whereupon intake passage 46 is connected to the filter section 67 through passages 53, 55, 57 and ferrule 61. After the next two or three thousand miles the process is repeated until all of the four filters have been used up after the car has run between eight and twelve thousand miles. The container 38 is then removed by releasing nuts 43 and is replaced by a new filter containing unused filter sections, or if the container is openable as illustrated in Fig. 4, the user may loosen bolts 75, open the container, remove the clogged filters and replace them with new unused filters.

In the event that the user fails to attend to the filter from time to time by rotating valve 49 in the manner described to place a new filter into operation and the filter becomes so clogged as to pass no oil or a negligible amount of oil, the pressure within the filter will exceed the tension of by-pass spring 73 so that ball valve 72 is unseated and oil passes directly through the container without being filtered. This is a safety arrangement and is only necessary where the filter is used to filter the entire output of the oil pump.

In another modification of the invention illustrated in Fig. 9, the transfer of the oil supply from a used or clogged filter section to a new or unused filter section is performed automatically. In this arrangement the oil supply tube 76 is connected to a block 77 secured to the bottom of the container 78 by means of bolts 79 passing through suitable openings in the container and secured at their inner ends to the plate 80 lying within the container and bearing the nipples 81 and 82 to which the filter sections 83 and 84 are respectively secured. Section 84 may be of larger capacity than section 83 for the reasons mentioned, and the sections also preferably contain the distending wire coils, not shown, and are disposed helically or otherwise in the container 78 to have free filtering action without interference with each other.

Oil supply tube 76 communicates with a chamber 85 located within the block 77 and having two outlets 86 and 87. Outlet 87 is normally closed by a valve 88 of large area connected by valve stem 89 to a small area valve 90, which is adapted to close outlet 86, but is normally unseated therefrom. Compression spring 91 seated between large valve 88 and a perforated guide 92 holds these valves in the positions mentioned.

Outlet 86 communicates through open valve 90 with nipple 81 and filter section 83, while outlet 87 may communicate with nipple 82 and filter section 84 when large valve 88 is open.

In operating the modified filter illustrated in Fig. 9, oil is normally supplied to filter section 83 from supply tube 76 through chamber 85, past open valve 90 and through nipple 81. The solid material is filtered out of the oil by the fabric of the filter section 83 and is retained in the bag, gradually building up as time goes on until the filtrate sludge layer is so thick that it no longer permits oil to pass through the filter. When this situation obtains, the pressure of the oil in the section 83 builds up to cause a back pressure sufficient to unseat large valve 88, spring 91 having sufficient resistance to the normal oil pressure to keep large valve 88 closed until this time. As large valve 88 is unseated oil may flow through outlet 87 into the other filter section 84 which then functions in the usual way, taking the place of clogged filter 83.

Small valve 90 being connected to large valve 88 by stem 89 is automatically closed when large valve 88 opens, and being of small area it does not oppose the movement of the large valve. Clogged filter 83 is thus disconnected automatically from the oil supply when unused filter 84 is automatically rendered effective. Thus, only one filter section is used at a time and the period of use is determined automatically by filtering requirements, i. e., when one filter section is clogged the supply is immediately switched to another unused section.

It will be seen that the old section 83 is closed by valve 90, so that none of the sludge therein can be forced by the pressure within the container into the oil supply or into the unused filter section 84. The sludge is sealed in the used section.

Although only two filter sections are illustrated in Fig. 9, the number may be increased as desired and a similar pressure-responsive valve mechanism arranged between successive sections to transfer the oil supply from one to the other as the sections become clogged. In order to replace the clogged filter sections, the plate 80 may be removed from the container 78 and replaced with one bearing new filter sections, or the entire container 78 may be replaced with a new one and secured to valve block 77 in the manner described.

Similar pressure-responsive valves or other means may be inserted in the ferrules 28' of the arrangement of Fig. 1, instead of the plugs 32, so that when the filter sections become clogged the direct pressure therein will unseat the valve to open the next succeeding section. However, this arrangement is not preferred, for if the sections are connected in series, the sludge from the first section will flow with the oil into the next section and shorten its life. Also, instead of valves, pressure-frangible membranes, pressure-displaceable plugs, or other equivalent means may be employed to place unused filter sections into action in response to abnormal pressures caused by a clogged filter section.

I claim:

1. In a filter, the combination of a container, a plurality of separate filter elements enclosed therein, means for supplying liquid, and a connection between said means and one of said elements, the unused filter elements being stored in substantially collapsed condition in the container, and said container being of a size only sufficient to accommodate one distended filter element and the remaining substantially collapsed elements.

2. In a filter, the combination of a container, a plurality of separate filter elements enclosed therein, means for supplying liquid, a connection between said means and one of said elements, and disconnecting means between said supply means and the other elements, the unused filter elements being stored in substantially collapsed condition in the container, and said container being of a size only sufficient to accommodate one distended filter element and the remaining substantially collapsed elements.

3. In a filter, the combination of a container, a plurality of separate filter elements enclosed therein, means for supplying liquid, a connection between said supply means and one of said elements, and means for disconnecting said one element from said supply means and connecting another element thereto, the unused filter elements being stored in substantially collapsed condition in the container, and said container being of a size only sufficient to accommodate one distended filter element and the remaining substantially collapsed elements.

4. In a filter, the combination of a container, a plurality of separate filter elements enclosed therein, means for supplying liquid, a connection between said supply means and one of said elements, means for disconnecting said supply means and said one element, and means for connecting said supply means and another element, the unused filter elements being stored in substantially collapsed condition in the container, and said container being of a size only sufficient to accommodate one distended filter element and the remaining substantially collapsed elements.

5. In a filter, the combination of a container, a plurality of separate filter elements enclosed therein, means for supplying liquid, and means responsive to abnormal pressure of the liquid for disconnecting one element from the supply means and connecting another element to the supply means.

6. In a filter, the combination of a container, a plurality of separate filter elements enclosed therein, means for supplying liquid, a communication between said supply means and one of said elements, and normally closed means responsive to abnormal pressure of the liquid resulting from a clogged element for transferring said communication to another element.

7. In a filter, the combination of a container, a plurality of separate filter elements enclosed therein, means for supplying liquid to said elements individually, and means responsive to abnormal liquid pressures resulting from clogging of an element for transferring the liquid supply successively to other elements and disconnecting the clogged elements therefrom.

8. In a filter, the combination of a container, a plurality of separate filter elements enclosed therein, means for supplying liquid, a connection between said supply means and one of said elements, a normally closed by-pass between said supply means and another of said elements, and means rendered effective by abnormal pressure of the liquid in said one element for opening said by-pass to supply liquid to said other element.

9. In a filter, the combination of a container, a plurality of separate filter elements enclosed therein, means for supplying liquid, a connection between said supply means and one of said elements, a normally closed connection between said one element and another element, and means responsive to abnormal pressure of the liquid in said one element for opening said normally closed connection to supply liquid to said other element.

10. In a filter, the combination of a container, a plurality of separate filter elements enclosed therein, means for supplying liquid, a connection between said supply means and one of said elements, a normally closed communication between said supply means and another element, and means responsive to abnormal pressure of the liquid in said one element for opening said communication and closing said connection, whereby said other element is connected to and said one element is disconnected from said supply means.

FRANK C. FROLANDER.